455-601 AU 233 EX
FIP8106 OR 3,845,293

[11] 3,845,293
[45] Oct. 29, 1974

Borner

[54] ELECTRO-OPTICAL TRANSMISSION SYSTEM UTILIZING LASERS

[75] Inventor: Manfred Borner, Ulm/Donau, Germany

[73] Assignee: Telefunken, Tepa, Patentverwertungsgesellschaft mbH, Ulm/Donau, Germany

[22] Filed: Sept. 28, 1972

[21] Appl. No.: 293,035

Related U.S. Application Data

[63] Continuation-in-part of Ser. No. 689,850, Dec. 12, 1967, abandoned.

[30] Foreign Application Priority Data

Dec. 13, 1967 Great Britain ..................... 56549/67
Dec. 20, 1967 France ............................ 67.133137

[52] U.S. Cl. ............................................. 250/199
[51] Int. Cl. ............................................. H04b 9/00
[58] Field of Search ................. 250/199; 179/15 FE; 325/62

[56] References Cited

UNITED STATES PATENTS

| | | | |
|---|---|---|---|
| 2,651,715 | 9/1953 | Hines | 250/199 |
| 3,319,080 | 5/1967 | Cornely et al. | 250/199 |
| 3,328,110 | 6/1967 | Berger et al. | 250/199 |
| 3,403,306 | 9/1968 | Haitz et al. | 317/235 T |
| 3,414,688 | 12/1968 | Hermes et al. | 325/62 |
| 3,488,586 | 1/1970 | Watrous et al. | 250/199 |
| 3,590,248 | 6/1971 | Chatterton | 250/199 |

Primary Examiner—Robert L. Richardson
Attorney, Agent, or Firm—Spencer & Kaye

[57] ABSTRACT

An information transmission system utilizing laser beams with information superimposed thereon by means of pulse code modulation and which comprises a plurality of repeater stations each of which contains a receiver in the form of a photosensitive semiconductor diode which directly detects the received signal, semiconductor amplifier pulse processing devices controlled by the signal pulses decoded by the associated receiver, and a transmitter in the form of a semiconductor laser which is not externally cooled for retransmitting the processed pulses. The information transmission between the repeater stations is effected by light-wave fiber conductors.

11 Claims, 7 Drawing Figures

ELECTRO-OPTICAL TRANSMISSION SYSTEM UTILIZING LASERS

CROSS REFERENCE TO RELATED APPLICATION

This application is a continuation-in-part of applicant's copending U.S. Pat. application Ser. No. 689,850, filed Dec. 12, 1967 and now abandoned.

BACKGROUND OF THE INVENTION

The invention relates to a multi-stage transmission system for information represented in pulse code modulation, wherein each transmission stage i.e., the primary transmitter and the repeater stations, comprises laser devices as transmitters, photosensitive devices as receivers and pulse processing or reshaping devices which are controlled by the signal pulses decoded by the associated receiver, and wherein a closed transmission section is provided between the stages.

In recent times, lasers have attracted more and more attention for use in communication of information because of their broad bandwidth. Heretofore, proposed transmission systems by means of laser devices have been divided into two groups using substantially two different principles. Neither of these principles has yet, however, found practical application.

The first group of these systems is a type of directional radio technique wherein the laser beams, modulated with the message content, are transmitted in optical view from the transmitting to the receiving station. Such a system is described for example in "Proceedings of the IEEE", March 1964, pages 305 to 306.

The decisive disadvantage of this type of transmission system lies in the fact that its ability to function depends on the weather and, in particular, ceases altogether due to fog or due to other atmospheric conditions which impair visibility.

The second group of information transmission systems using lasers seeks to utilize the above-mentioned property of broad bandwidth of the transmission carrier to its full extent and accordingly aims at utilizing this broadness of bandwidth to its full extent over the transmission channels as well. In this type of system so-called light pipes or waveguides are used as the transmission media. These generally consist of internally mirror-coated hollow tubes along the axis of which there are provided optical guides in the form of lenses which may be found either of glass or of gas distributions and which center the laser beam on the axis of the hollow tube which has a diameter of a few centimeters. Such information transmission systems are described, for example, in "The Bell System Technical Journal", July 1964, on pages 1759–1782. The propagation of the laser beams in the tubes is effected along a straight line over relatively long distances. For deflection, mirrors are introduced into the section of pipe and are then followed by a further rectilinear pipe. Other optical deflection devices, such as prisms, may naturally be used instead of the mirrors.

The main disadvantage of this type of information transmission medium is that the lenses centering the laser beam must not only initially be very accurately adjusted but additionally particularly if gas lenses are used, it is necessary to continually check this adjustment and to readjust the lenses when required. In addition, the laying of the hollow tubes, which must be effected as rectilinearly as possible, is very complicated because it is frequently impossible to find land surfaces adapted to this rectilinear laying of the transmission section. Consequently considerable digging is often inevitable in the course of the laying of a transmission section. Still another disadvantage of this type of system is the high cost and technical complexity of the circuitry required to pick up the modulation content contained in the laser beam. That is, since pulse code modulation is very sensitive to travel time distortions which may cause the scanned pulses to run into or overlap one another, in the hollow tube or waveguide systems wherein such travel time distortions occur the main receivers and also the receiver in each of the repeater stations usually operate on the superheterodyne principle and require very expensive optical demodulators. Therefore this expenditure only appears justified economically in the case of very long transmission sections, e.g. in the order of several kilometers particularly with transmission devices for very broad bandwidth. Finally, since the installations are extensive and, because they require continuous maintenance, they have the additional disadvantage that they cannot be accommodated underground as intermediate repeaters frequently are located today in cable connections.

SUMMARY OF THE INVENTION

It is therefore the object of the invention to provide a transmission system with laser beams as information carriers which is distinguised, on the one hand, by a substantially unlimited range undisturbed by outside influences and, on the other hand, can be taken along any desired paths and at the same time only requires low technical expenditure on the transmission channels despite a considerable useful bandwidth.

The above object is achieved according to the invention by a multi-stage laser beam transmission system for information represented in pulse coded modulation which includes at least one laser transmitter stage for producing a light beam which is pulse code modulated by the information to be transmitted, a light responsive receiver stage means for receiving the pulse code modulated light beam and a closed signal transmission channel, including a plurality of series connected repeater stages connecting the transmitter stage means with the receiver stage means. Each of the repeater stages includes a photosensitive receiver including a semiconductor photodiode connected as a direct detector for the received light, a semiconductor amplifier for amplifying the electrical output signals from the photodiode, a semiconductor pulse processing circuit for reshaping the amplified electrical signals and a non externally cooled semiconductor laser which is responsive to the reshaped electrical signals and which emits a light beam modulated by the reshaped pulses. The sections of the transmission channel between the output of one stage of the system and the input of the succeeding adjacent stage of the system consists of light wave fiber conductors.

Ordinary commercial fiber conductors may be used for the light-wave propagation. Such fiber conductors and their use are described, for example, in: Kapany, Burke, "Fiber Optics", IX. Wave Guide Effects, Volume 51, No. 10, 1961, pages 1067–1078; Kapany, Burke, "Dielectric Wave Guides and Optical Frequencies", Solid State Design 3, 1962, pages 35–42; Hicks, Kiritsy, "Fiber Optics Handbook", Mosaic Fabrications, Southbridge, Mass; and Kao et al. "Dielectric-fiber surface Waveguides for Optical Frequencies", Proceeding of IEEE Vol. 113, No. 7, July 1966, pages 1151–1158.

The combination of the above features, offers the possibility of taking the transmission channel over any desired route and along any desired curves, because light-wave fiber conductors can be adapted to substantially any given terrain, and, finally, offers the possibility of combining a very large number of similar fibers to form a cable bundle so that a very large number of mutually independent transmission channels can be provided with the minimum expense. It is likewise possible to decouple these individual transmission channels from the cable bundle at any point which may be selected as desired and which may be adapted to the particular requirements regarding transmission capacity, by laterally removing one or more fibers from the entire cable.

The intermediate amplification of the transmitted signals, in the repeater, which is necessary with the combination according to the invention and which, , in contrast to the previous proposal with light waveguides using hollow tubes, ought to be effected at relatively short intervals, e.g. in the order of from 20–100 meters depending on the attenuation of the lightwave fiber conductor in the case of relatively long distances from transmitter to receiver, and the renewed pulse processing or pulse shaping which is likewise necessary at relatively short intervals, offer an advantage insofar as it is further possible to branch off the transmitted intelligence at the processing points, i.e. at the repeaters. Since the signals are actually prepared entirely anew in each repeater there is the possibility of distributing them over a plurality of channels which in turn may be spatially separated from one another. Thus, the necessity for frequent intermediate amplification or pulse shaping scarcely represents a disadvantage. The technical means necessary for this, such as the pulse processing devices which are realized in the form of semiconductor circuits, do not lead to any appreciable expense in view of the micro-miniaturization technique and the production of integrated semiconductor circuits which are becoming more and more common today. Pulse-shaping circuits built up in this manner can easily be arranged in the course of the line, even underground, without it being necessary that the intermediate repeater stations be above-ground.

The light-wave conductors used in accordance with the invention as transmission sections may basically be of two types depending on the requirements with regard to the density of branching points, which types are described, for example, in the literature cited above in connection with light-wave fiber conductors. Light-wave fiber conductors of the one type are comparable in their transmission characteristics with conventional waveguides insofar as it is ensured by their geometrical configuration, particularly the dimensions of their cross section, that only one specific mode can generally exist therein, whereas light-wave fiber conductors of the other type merely propogate the fluctuation in intensity of a light-wave, that is to say, in general, a mixture of a relatively large number of different modes, without influencing the different transit times of these modes. The former type of light-wave fiber conductors are distinguished from the latter by less attenuation and above all by less pulse distortion over the transmission channel. They would therefore preferably be used when there are greater distances between the branching points, the location of which is determined by the demand for communication-channel capacity in the individual receiving stations. Where a high branching point density is needed, the light-wave fiber conductors of the second type offer an advantage insofar as they are less expensive than the first-mentioned type and therefore a densely branched transmission network can be established at lower cost. This is all the more possible because, in general, with dense branching of the transmission channels, the information content to be transmitted over the individual transmission channel will in general be less; consequently pulse distortions which occur over the transmission channels will be more acceptable because they are not so disturbing and will not falsify the information as much as with dense packing of the information.

DESCRIPTION OF THE PREFERRED EMBODIMENTS

Figure 1:
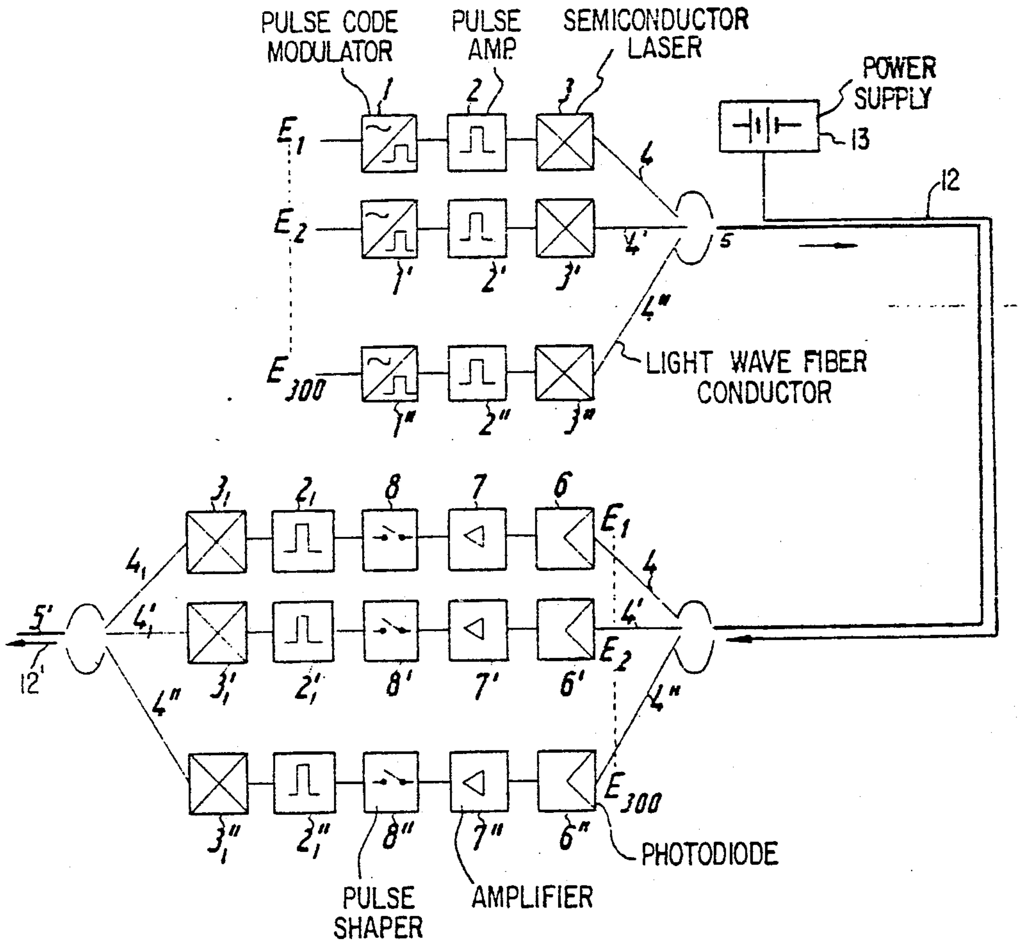
FIG. 1 is a block circuit diagram for a multichannel transmitting station and an intermediate repeater station for a transmission system according to the invention which form part of a transmission line.

At the primary transmission or signal initiation station, the channels $E_1$ to $E_{300}$, which represent carrier-frequency conversation groups, each of 1200 channels 4 kcps wide and one next to the other as regards frequency, are fed to 300 separate coder stages 1, 1', 1''. In the coder stages, the information is scanned by means of pulses and the scanned amplitudes are used in the usual manner to represent groups of pulses i.e. pulse code modulation. These groups of pulses are amplified in the respective power amplifier stages 2, 2', 2'' so that they can serve to control respective semiconductor lasers 3, 3', 3''. The pulse code modulated output light signals from each of these 300 semiconductor lasers in turn excites a respective light-wave fiber conductor 4, 4', 4'' of a multiple conductor cable or line 5 which conveys the information over a section or distance of 20 to several hundred meters where it is picked up by means of 300 photo-sensitive receivers 6, 6', 6'' which are coupled to the respective fiber conductors 4, 4', 4'' of an intermediate repeater station. The light intensity at the input of the photo-sensitive receivers 6, 6', 6'', which is constituted by a photo-sensitive semiconductor diode, is still sufficiently large enough, inspite of the attentuation of the light-wave conductors of the cable 5, to exceed the noise of the photo-sensitive receiver 6, 6', 6'' and the following respectively connected amplifiers 7, 7', 7'' by an amount sufficient for the presence of a pulse to be clearly distinguished from the absence of a pulse in the respective pulse reshaping or regenerator stages 8, 8', 8''. Each of the regenerators 8, 8', 8'' is again followed by a respective power amplifier stage 2, 2', 2'' which controls the 300 laser diodes 3, 3', 3'' of the repeater stage in the same manner as in the first or primary transmitter. As shown, the outputs of all the 300 laser diodes 3, 3', 3'' are again associated with the 300 light-wave fiber conductors 4, 4', 4'' respectively of one and the same multiple conduction line 5' which leads to the next intermediate repeater station which is similar to that shown in the figure and so on until the signal is finally detected by a receiver at the desired location. It is, of course, also possible to supply the output radiation of these 300 lasers to different multiple lines in smaller bundles which then leads to a light waveguide network.

If desired, power for the intermediate repeater stations may be provided by means of one or more electrical conductors 12 connected to the power supply line of a power supply 13 which may, for example, be located at the site of the primary transmitter and additionally supplies power thereto. In such an event, the electrical conductor 12 is preferably incorporated into the cables 5, 5' containing the individual light fiber conductors.

Figure 2:
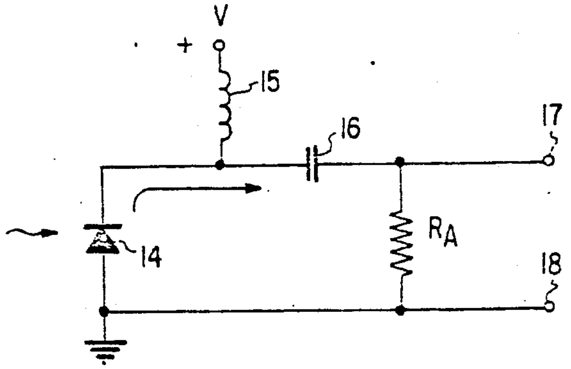
FIG. 2 is a schematic circuit diagram of the photosensitive receiver for the repeater stations according to the invention.

Referring now to FIG. 2 there is shown the circuit diagram of the relatively simple and inexpensive photo-sensitive receiver of each repeater stage whereby direct detection i.e. no heterodyning of the received signal takes place. Such a simple detection circuit is possible with the system of the invention since no transit time distortion of the type occurring in the above mentioned prior art systems occur. The photo-sensitive receiver includes a photo-sensitive semiconductor photo diode 14 which receives the modulated light beam from the section of light-wave fiber conductor to which it is coupled. One terminal of the photo-diode 14 is connected to ground, while the other terminal is connected, via a choke coil 15 to a source of positive d.c. voltage V which due to the polarity of the diode will normally tend to block same. A capacitor 16 is connected in series with the diode 14 and a load resistance $R_A$ is connected in parallel with this series connection. The output terminals 17 18 of the receiver are connected to the respective ends of the load resistance $R_A$. With these straight line type receiver, the high frequency electrical signals corresponding to the optical signals received by the photo diode 14 are blocked by the choke coil 15 and are applied across the load resistance $R_A$ via the capacitor 16 which blocks the direct current. The signal appearing across the resistance $R_A$, and hence at the output terminals 17 and 18 is then fed to the succeeding circuits of the repeater.

Figure 3:
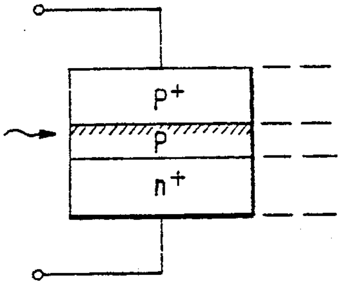
FIG. 3 illustrates a preferred embodiment of a photodiode as used in the photosensitive receiver of FIG. 2.
Figure 4:
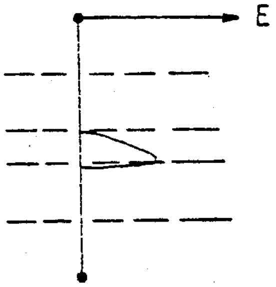
FIG. 4 shows the field lines for the photodiode of FIG. 3.

Preferably the photo diode 14 is an avalanche diode, i.e., a diode which operates according to the avalanche effect, since in such diodes it is possible to not only obtain rectification but additionally to obtain amplification of the received signal. In particular, as a result of the avalanche effect in such diodes an internal amplification of approximately 30dB is possible. A typical avalanche diode is shown in FIG. 3. The $p^+$ and $n^+$ regions are heavily doped p and n regions. In such diodes irradiation of of the $p^+$ p junction area with light causes electrons to be released which are accelerated in the direction toward the $n^+$ region and produce the avalanche effect in the vicinity of the $pn^+$ junction. The field lines for such an avalanche diode are shown in FIG. 4.

The use of an avalanche diode as the photo-sensitive receiver has the additional advantage that if further amplification of the signal is desired without requiring any additional components, such amplification may be obtained by using a pulse repitition rate for the pulse code modulated signal which is substantially lower than the maximum possible pulse rate which can be processed by the diode. For example a pulse repitition rate of 2G bits per second may be used for the pulse code modulation which is still sufficiently high to provide for efficient economic operation of the system but is substantially lower than the maximum rate which can be processed by semiconductor avalanche diodes according to the state of the art.

Figure 5:
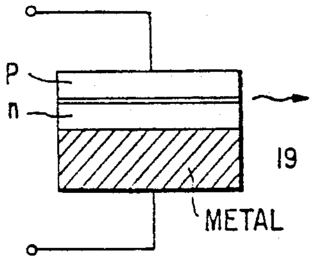
FIGS. 5 and 6 schematically illustrate embodiments of the laser diodes used in the repeater stations of FIG. 1.
Figure 6:
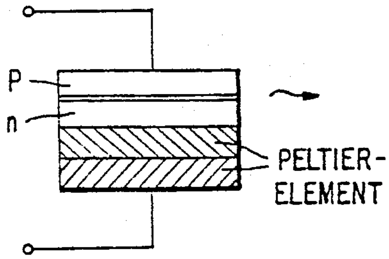

Referring now to FIG. 5, there is shown a schematic representation of a semiconductor laser diode of the type which may be used for the transmitter of the repeater. The laser diode includes superimposed p and n semiconductor regions mounted on top of a metal plate 19. In such a diode the influence of an electrical voltage applied across the diode causes electrons and holes to flow into the pn junction region and thereto recombine and emit radiation. Such a diode according to the state of the art will operate satisfactorily at normal temperatures without external cooling thereof. However, the efficiency of such a diode is substantially increased if it is cooled. Therefore since external cooling of the diode would be unsatisfactory for the desired purpose, the cooling is provided internally for example, by forming the metal layer 19 of two layers of dissimilar metals which in a manner known in the art form a Peltier junction.

Figure 7:
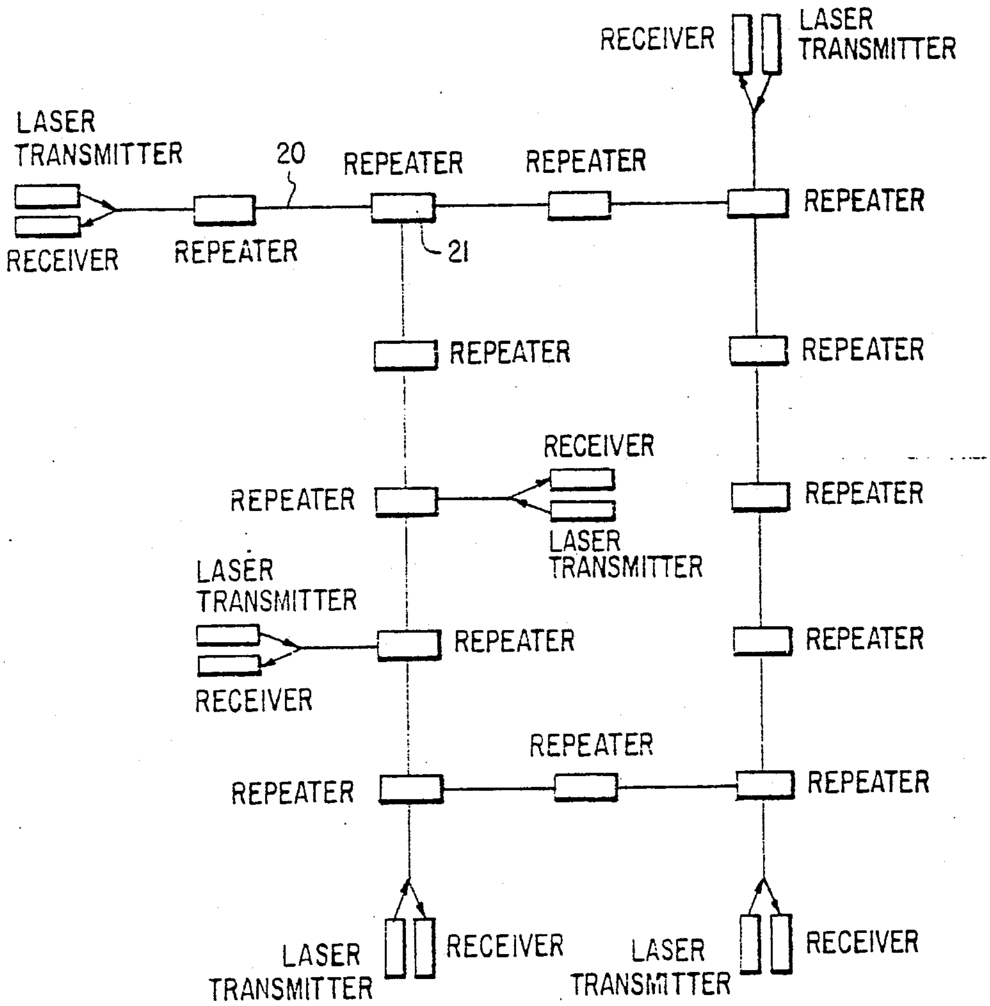
FIG. 7 is a block diagram of a communications network formed from transmission channels according to the invention.

Referring now to FIG. 7 there is shown still a further possibility for a laser beam transmission system according to the invention, and in particular a multi-branched transmission network. As shown in FIG. 7, the network includes a plurality of laser transmitters and a plurality of semiconductor photo-sensitive receivers. The individual receivers and transmitters are all interconnected via light-wave fiber conductor sections 20 and repeaters 21. As is clear from the figure, the branching of the system takes place at a repeater stage and any number of such branches may be provided in the network. Since as mentioned above, the repeater stages must be relatively close together with the system according to the invention, this permits branching of the system if desired at relatively short intervals.

The transmission system according to the invention has the particular advantage in that the use of inexpensive components in conjunction with the simple direct detection principle for the receiver of the repeater permits the construction of a practical communication system for a frequency range which is not covered by the known microwave technique ($H_{10}$ Wave in the wave guide). Additionally, the system according to the invention can be realized much more economically than the prior art hollow guide tube systems. For example in such hollow guide tube systems economical operation can be realized only when the repeater stations are several kilometers apart whereas with the system according to the invention economical operation is realized when the repeater stations are only 20 meters apart.

It will be understood that the above description of the present invention is susceptible to various modifications, changes and adaptations, and the same are intended to be comprehended within the meaning and range of equivalents of the appended claims.

I claim:

1. A laser beam transmission system for information represented in pulse code modulation comprising in combination:

a laser transmitter stage means for producing a light beam which is pulse code modulated with the information to be transmitted;

a light responsive receiver stage means for receiving the pulse code modulated light beam; and a signal transmission channel connecting said transmitter stage means with said receiver stage means, said transmission channel including a plurality of series connected repeater stages and a plurality of closed light signal transmission sections consisting of light-wave fiber conductors, each of said sections connecting the output of one stage with the input of the succeeding adjacent stages of said system, each of said repeater stages including a photosensitive receiver for the information bearing light emitted by the preceeding stage, said photosensitive receiver including a semiconductor avalanche photodiode connected to provide for the direct detection of the received light, a semiconductor amplifier for amplifying the electrical signals from said photodiode, a semiconductor pulse-processing circuit means for reshaping the amplified electrical signals, and a non-externally cooled semiconductor laser means, which is responsive to the reshaped electrical signals from said pulse-processing circuit means, for producing a light beam modulated according to said reshaped electrical signals and transmitting the information to the succeeding stage of said system via one of said closed transmission sections.

2. The laser beam transmission system as defined in claim 1 wherein the maximum pulse rate of the signal transmitted by said transmitter means is approximately 2 G bits per second and wherein the maximum pulse rate to which said photodiodes will respond is substantially higher than this value whereby increased amplification in said avalanche diodes is obtained.

3. A laser beam transmission system as defined in claim 1 wherein said photosensitive receiver comprises: a capacitor connected in series with said photodiode, a choke coil connected between the source of d.c. potential and the terminal of said photodiode which is connected to said capacitor, and a load resistance connected in parallel with the series connection of said photodiode and said capacitor, and, a pair of output terminals for said photosensitive receiver connected respectively to the opposite ends of said load resistance.

4. A laser beam transmission system as defined in claim 1, wherein each of said semiconductor laser means is a semiconductor injection laser diode.

5. A laser beam transmission system as defined in claim 4 wherein said semiconductor injection laser diodes are internally cooled semiconductor laser diodes.

6. A laser beam transmission system as defined in claim 1, wherein the said light-wave fiber conductors are designed in such a manner and so dimensioned that only individual light-wave modes can develop therein.

7. A laser beam transmission system as defined in claim 1, wherein the said light-wave fiber conductors are designed in such a manner that they propagate fluctuations in intensity of the light.

8. A laser beam transmission system as defined in claim 1, wherein said transmission system includes a plurality of like parallel channels; and wherein the transmission sections constituted by the plurality of light-wave fiber conductors for the respective channels are combined to form a multi-conductor cable.

9. A laser beam transmission system as defined in claim 8, wherein said cable further includes at least one electrical conductor which is connected to a power supply line for supplying the power required in a repeater stage.

10. A laser beam transmission system as defined in claim 8, wherein at least some of said transmission sections are divided into a plurality of cables at the output of one or more repeater stages, with each cable containing a portion of said plurality of light-wave fiber conductors.

11. A laser beam transmission system as defined in claim 1, wherein said transmission system includes a plurality of said transmitter stage means and of said receiver stage means; and wherein said transmission channel includes a plurality of branches, interconnected by means of said repeater stages, connecting said plurality of transmitter stage means to said plurality of receiver stage means to form a transmission network therebetween.

* * * * *

UNITED STATES PATENT OFFICE
CERTIFICATE OF CORRECTION

Patent No. 3,845,293 Dated October 29th, 1974

Inventor(s) Manfred Börner

It is certified that error appears in the above-identified patent and that said Letters Patent are hereby corrected as shown below:

In the heading of the patent, under [30] "Foreign Application Priority Data", delete "Dec. 13, 1967 Great Britain.... 56549/67 Dec. 20, 1967 France.... 67.133137" and insert --Dec. 21, 1966 Germany.... T32,812--.

Column 2, line 30, change "distinguised" to --distinguished--.

Column 3, line 62, change "propogate" to --propagate--.

Column 4, line 65, change "attentuation" to --attenuation--.

Column 5, line 65, change "of of" to --of--.

Column 6, line 8, change "repitition" to --repetition--; line 11, change "repitition" to --repetition--; line 25, change "thereto" to --there to--.

Signed and sealed this 13th day of May 1975.

(SEAL)
Attest:

RUTH C. MASON
Attesting Officer

C. MARSHALL DANN
Commissioner of Patents
and Trademarks